Dec. 27, 1966   W. W. CARSON, JR., ET AL   3,294,438
REMOVABLE MIRROR ASSEMBLY
Filed Oct. 20, 1964
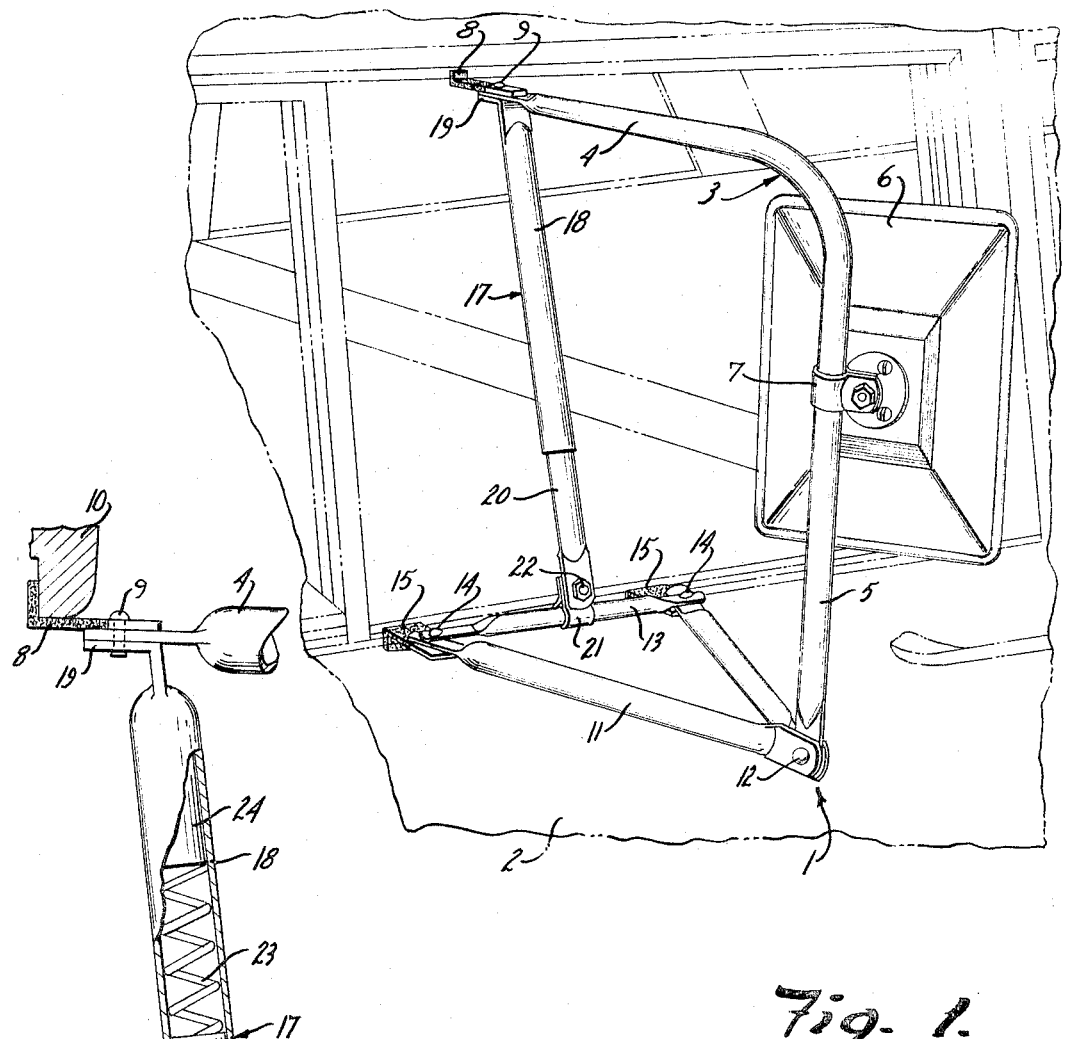
Fig. 1.
Fig. 2.
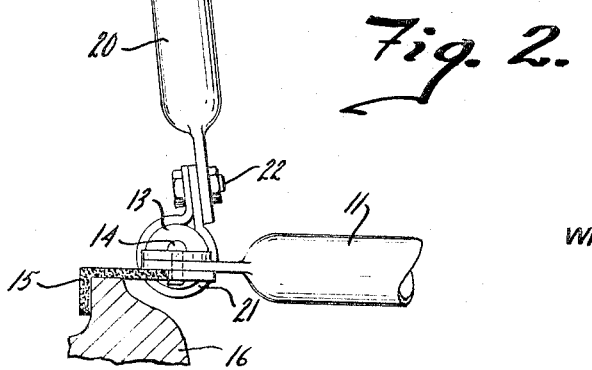
INVENTORS
WILLIAM WALLER CARSON JR.
WILLIAM J. MURGAS
BY
Andrus & Starke
Attorneys

United States Patent Office 3,294,438
Patented Dec. 27, 1966

3,294,438
REMOVABLE MIRROR ASSEMBLY
William Waller Carson, Jr., and William J. Murgas, Wauwatosa, Wis., assignors to Velvac, Inc., Milwaukee, Wis., a corporation of Wisconsin
Filed Oct. 20, 1964, Ser. No. 405,169
5 Claims. (Cl. 296—152)

This invention relates to a mirror assembly for a vehicle and more particularly to a removable mirror assembly for a vehicle which is adapted to tow a trailer.

The conventional side view mirror which is mounted on an automobile is generally not adequate to provide complete vision to the rear when the vehicle is towing a house trailer, camping trailer, boat, or the like, due to the width of the trailer or boat. To provide adequate vision to the rear it is necessary to extend the mirror outwardly from the side of the vehicle. Mirrors of the type which are used with vehicles adapted to tow trailers are, in most cases, permanently installed on the vehicle, or in some cases, are temporarily installed by means of straps and/or braces. The permanently mounted type of mirror has an inherent disadvantage in that it detracts from the appearance of the automobile when the automobile is not towing a trailer. The conventional, temporarily mounted type of mirror also has disadvantages in that it requires a substantial time to install and remove the mirror, and further, mirrors of this type tend to vibrate excessively at high speeds.

The present invention is directed to a side view mirror for a vehicle, such as an automobile, which can be readily snapped in position on the automobile when the automobile is towing a trailer and can be readily removed when the automobile is not towing a trailer. More specifically, the mirror assembly includes a generally L-shaped frame including an upper horizontal leg and a vertical leg. A mirror is adjustably mounted on the vertical leg in a position a substantial distance outward of the automobile or vehicle.

The inner end of the horizontal leg of the frame is provided with a foot which engages the molding at the upper edge of the window of the vehicle and the lower end of the vertical leg of the frame is connected to a pair of diverging brace members. Each brace member terminates in a foot which engages the molding at the lower edge of the window at spaced locations to thereby provide a three point support for the mirror assembly. The upper foot is urged or biased away from the lower feet by a spring loaded telescopic member.

To mount the mirror assembly on the vehicle, the lower feet are engaged with the window molding and the telescopic member is compressed, enabling the upper foot to be engaged with the window molding. By releasing the compression on the telescopic member, the upper foot is then urged into engagement with the molding to firmly position the mirror assembly on the vehicle.

The mirror assembly of the invention can be rapidly installed on the vehicle without the use of any auxiliary straps, braces, etc. and the mirror assembly can be readily removed from the vehicle when the vehicle is not towing a trailer.

Due to the three point suspension the mirror assembly is substantially free of vibration and the mirror provides excellent rear vision, being particularly adaptable for use with vehicles towing house trailers, camping trailers, boats, and the like.

Other objects and advantages will appear in the course of the following description.

The drawings illustrate the best mode presently contemplated of carrying out the invention.

FIGURE 1 is a perspective view showing a mirror assembly as mounted on a vehicle; and FIG. 2 is a side elevation of the mirror assembly mounted on the vehicle with parts broken away in section.

The drawings illustrate a mirror assembly 1 which is removably mounted on an automobile 2 or other vehicle. The mirror assembly includes a generally L-shaped frame 3 which includes a horizontal leg 4 and a vertical leg 5. A conventional mirror 6 is mounted on the vertical leg 5 by means of a bracket 7. The mirror 6 is a conventional type which can be swiveled with respect to the bracket 7 to adjust the angularity of the mirror with respect to the frame 3.

A generally L-shaped foot 8 is attached to the flattened inner end of horizontal leg 4 by a bolt 9. The foot 8 is coated with plastic, rubber or other resilient material so that when the foot 8 engages the molding strip 10 along the upper edge of the window in the vehicle the engagement will not mar or scratch the molding.

The lower end of vertical leg 5 is flattened and is connected to the outer ends of a pair of diagonal braces 11 by a bolt 12. The inner ends of the braces 11 are connected together by a cross brace 13, and bolts 14 connect the flattened ends of the cross brace 13, the inner ends of the braces 11 and the outer ends of L-shaped feet 15. Feet 15 are similar in construction to the foot 8, being provided with a plastic or rubber coating, and are adapted to engage the molding strip 16 which extends along the bottom edge of the window of the vehicle 2.

The upper foot 8 is urged in a direction away from the lower feet 15 to firmly position the mirror assembly on the vehicle 2 by a telescopic brace 17. The telescopic brace 17 includes an upper tubular member 18 having a flange 19 which is secured to the inner flattened end of the leg 4 by the bolt 9. A lower telescopic member 20 is slidably mounted within the interior of the upper member 18 and the lower end of telescopic member 20 is flattened and secured to a strap 21 by bolt 22. The strap 21 is disposed around the central portion of cross brace 13 and provides a pivotal connection between the telescopic brace 17 and the cross brace 13.

The telescopic members 18 and 20 are biased to the extended position by coil spring 23 which bears between the upper end of member 20 and a stop 24 secured within the upper member 18. The spring 23 acts to urge the telescopic members apart and thereby forces the feet 8 and 15 into firm engagement with the molding strips 9 and 16 bordering the windows.

To mount the mirror assembly on the vehicle, the feet 14 are initially engaged with the molding strip 16 at the lower edge of the window. A force is then applied to the horizontal leg 4 which serves to compress the spring 23 so that the foot 8 can be moved inwardly beneath the molding strip 10. By releasing the pressure on the horizontal leg 4, the spring 23 will then act to force the foot 8 into firm engagement with the upper molding strip 10.

The mirror assembly can be readily removed by merely pushing downwardly on the horizontal leg to compress the spring 23 so that the foot 8 can be slipped outwardly beneath the molding strip 10.

The mirror assembly of the invention can be rapidly installed in a matter of seconds on the vehicle. Similarly the mirror assembly can be readily removed when the vehicle is not towing a trailer, boat, or the like. As the feet 8 and 14 are relatively thin and engage the molding strip, the window can be rolled up and down while the mirror is installed without interference.

Moreover the mirror assembly is exceptionally stable poviding vibration free vision to the rear. The stability is achieved by virtue of the three point suspension of the mirror assembly with the vehicle. The engagement of the foot 8 with the upper molding strip 10 is in a vertical plane between vertical planes passing through the points of engagement of the feet 14 with the lower molding strip 16. This provides a stable three point mounting suspension which eliminates vibration of the frame and mirror.

Various modes of carrying out the invention are contemplated as being within the scope of the following claims particularly pointing out and distinctly claiming the subject matter which is regarded as the invention.

We claim:

1. In combination with a vehicle having a window and having a molding bordering the window, a mirror assembly, comprising a generally L-shaped frame including a horizontal section and a vertical section, a mirror adjustably connected to the vertical section, a first mounting foot connected to the inner end of said horizontal section and disposed in bearing engagement with the portion of the molding bordering the upper edge of the window, a second mounting foot connected to the lower end of said vertical section and disposed in bearing engagement with the molding bordering the lower edge of the window, and a third mounting foot connected to the lower end of said vertical section and disposed in bearing engagement with the molding bordering the lower edge of said window, said second and third mounting feet being disposed in spaced relation and lying in the same horizontal plane whereby said mounting feet provide a three point suspension for said mirror assembly with respect to the vehicle, said first mounting foot being generally L-shaped and including an upwardly extending flange and said second and third mounting feet being generally L-shaped and having downwardly extending flanges, and resilient means for urging said first mounting foot in a direction away from said second and third mounting feet to thereby bias the feet into engagement with said molding.

2. In combination with a vehicle having a window and having a molding bordering the window, a mirror assembly comprising a generally U-shaped frame including a generally vertical section and a pair of generally horizontal sections, a mirror mounted on the vertical section, a single mounting member connected to one of said horizontal sections for engaging the molding bordering the window, a pair of mounting members associated with the other of said horizontal sections and disposed in engagement with the molding at spaced locations thereon, and resilient means interconnecting said horizontal sections and spaced from said vertical section for urging said single mounting member in a direction away from said pair of mounting members to thereby urge the mounting feet into tight bearing engagement with the respective moldings.

3. In combination with a vehicle having a window and having a molding bordering the window, a mirror assembly comprising a generally U-shaped frame including a vertical section and including an upper horizontal section and a lower horizontal section, a mirror adjustably mounted on the vertical section, a first mounting foot associated with the upper horizontal section and disposed in engagement with the molding bordering the upper portion of the window, a pair of mounting feet connected to the lower horizontal section and disposed in engagement with the molding bordering the lower portion of said window, said pair of mounting feet being disposed in spaced relation, and spring loaded telescopic means connected between the inner portions of said upper horizontal section and the lower horizontal section for urging the first mounting foot in a direction away from said pair of mounting feet.

4. In combination with a vehicle having a window and having a molding bordering the window, a mirror assembly comprising a generally L-shaped frame having a horizontal section and a vertical section, a mirror adjustably mounted on said vertical section, a first mounting foot connected to the inner end of the horizontal section and adapted to engage the molding bordering the upper portion of said window, a pair of diagonally extending braces connected to the lower end of said vertical section, a second mounting foot associated with the inner end of each of said diagonal braces with each second foot adapted to engage the molding bordering the lower portion of said window and said second feet being spaced apart, a cross brace connecting the inner portions of said diagonal braces, and resilient means connecting the cross brace and said horizontal section for urging said first mounting foot in a direction away from said second mounting feet to thereby bias the feet into firm engagement with said molding.

5. In combination with a vehicle having a window and having a molding bordering the window, a mirror assembly comprising a generally U-shaped frame including a generally vertical section, an upper generally horizontal section and a lower generally horizontal section, a mirror mounted on the vertical section, a first mounting foot connected to the upper horizontal section and disposed in engagement with the molding bordering the upper portion of the window, a pair of mounting feet connected to the lower horizontal section and disposed in engagement with the molding bordering the lower portion of said window, said pair of mounting feet being disposed in spaced relation, an upper telescopic member connected to the upper horizontal section, a lower telescopic member slidably disposed with respect to the upper telescopic member and connected to the lower horizontal section, and resilient means for urging the telescopic members to an extended position to thereby urge the feet into engagement with the molding.

References Cited by the Examiner
UNITED STATES PATENTS

| 2,510,175 | 6/1950 | Hess | 224—42.25 |
| 2,969,715 | 1/1961 | Mosby | 88—98 |
| 3,007,582 | 11/1961 | Lindstrom | 211—87 |

BENJAMIN HERSH, *Primary Examiner.*

P. GOODMAN, *Assistant Examiner.*